(12) United States Patent
Sano et al.

(10) Patent No.: US 11,435,787 B2
(45) Date of Patent: Sep. 6, 2022

(54) PORTABLE INFORMATION DEVICE AND MICROPHONE PRESSURE COMPONENT

(71) Applicant: LENOVO (SINGAPORE) PTE. LTD., Singapore (SG)

(72) Inventors: Tetsuya Sano, Yokohama (JP); Tatsuya Ushioda, Yokohama (JP); Hiroaki Kinoshita, Yokohama (JP); Kazuya Tatsuno, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/345,197

(22) Filed: Jun. 11, 2021

(65) Prior Publication Data

US 2022/0011830 A1 Jan. 13, 2022

(30) Foreign Application Priority Data

Jul. 10, 2020 (JP) .............................. JP2020-119316

(51) Int. Cl.
*G06F 1/16* (2006.01)

(52) U.S. Cl.
CPC .......... *G06F 1/1684* (2013.01); *G06F 1/1681* (2013.01)

(58) Field of Classification Search
CPC .... G06F 1/1652; G06F 1/1684; H04M 1/035; H04R 1/342
See application file for complete search history.

(56) References Cited

U.S. PATENT DOCUMENTS

| 5,790,679 | A  | * | 8/1998  | Hawker  | H04R 1/288 |
|           |    |   |         |         | 381/163    |
| 6,643,529 | B1 | * | 11/2003 | Inoue   | H04M 1/0235 |
|           |    |   |         |         | 455/90.3   |
| 9,661,410 | B1 | * | 5/2017  | Iwai    | H05K 5/0217 |
| 10,152,088| B2 | * | 12/2018 | Ka      | G09G 3/2003 |
| 10,296,057| B2 | * | 5/2019  | Suezawa | G06F 1/1658 |
| 10,671,129| B2 | * | 6/2020  | Suezawa | H05K 5/069 |
| 2006/0258325 | A1 | * | 11/2006 | Tsutaichi | H04M 1/18 |
|           |    |   |         |         | 455/350 |
| 2014/0004913 | A1 | * | 1/2014 | Kimura | H04B 1/3833 |
|           |    |   |         |         | 455/575.1 |

(Continued)

FOREIGN PATENT DOCUMENTS

| JP | 60134351 | 9/1985 |
| JP | 08009481 A | 1/1996 |

(Continued)

*Primary Examiner* — Adrian S Wilson
(74) *Attorney, Agent, or Firm* — Shimokaji IP (57) ABSTRACT

A portable information device includes: a chassis having an upper cover defining a top face, a lower cover defining a bottom face, and a vertical wall standing between edges of the upper cover and the lower cover to define a side face; a microphone hole that penetrates the vertical wall and opens to the side face; a microphone module in the chassis, including a microphone facing the microphone hole, the microphone module being configured to acquire sound information outside the chassis with the microphone; and a microphone pressure component between the vertical wall and one of the upper cover and the lower cover to be compressed therebetween and press the microphone module against an inner face of the vertical wall.

11 Claims, 9 Drawing Sheets

(56) References Cited

U.S. PATENT DOCUMENTS

| | | | | |
|---|---|---|---|---|
| 2015/0256657 A1* | 9/2015 | Choe | ............... | H04M 1/03 |
| | | | | 455/550.1 |
| 2016/0014488 A1* | 1/2016 | Iwaya | ............... | H04M 1/03 |
| | | | | 381/91 |
| 2016/0299536 A1* | 10/2016 | Mori | ............... | H04M 1/03 |
| 2018/0321712 A1* | 11/2018 | Suezawa | ............... | H05K 5/02 |
| 2018/0364759 A1* | 12/2018 | Ahn | ............... | B32B 27/281 |

FOREIGN PATENT DOCUMENTS

| JP | 09327083 A | 12/1997 |
|---|---|---|
| JP | 2002247166 A | 8/2002 |
| JP | 2012222473 A | 11/2012 |
| JP | 2013165409 A | 8/2013 |
| JP | 2017055361 A | 3/2017 |
| JP | 2017510065 A | 4/2017 |
| JP | 2018112833 A | 7/2018 |

\* cited by examiner

PORTABLE INFORMATION DEVICE AND MICROPHONE PRESSURE COMPONENT

FIELD OF THE INVENTION

The present invention relates to a portable information device equipped with a microphone and a microphone pressure component mounted on the portable information device.

BACKGROUND OF THE INVENTION

Japanese Unexamined Patent Application Publication No. 2018-112833, for example, proposes a portable information device including a flexible display, such as an organic electro luminescence (EL) so that not only the chassis but also the display are foldable.

SUMMARY OF THE INVENTION

The portable information device of Japanese Unexamined Patent Application Publication No. 2018-112833 includes many electronic components and structural components on the rear of the bezel member that surrounds the display. This configuration may fail to place a microphone on the rear of the bezel member as in a typical laptop PC disclosed in Japanese Unexamined Patent Application Publication No. 2013-165409. Then such a portable information device may be configured to place a microphone toward a side face of the chassis.

Conventional microphone modules are fixed to the chassis using screws as disclosed in Japanese Unexamined Patent Application Publication No. 2013-165409, for example. The side face of the chassis, however, has an undercut, which causes the difficulty of complicated machining such as for a positioning pin. The microphone needs to have a high degree of airtightness in order to prevent noise. A microphone simply fixed to the surface of the chassis with double-sided tape or the like therefore may fail to have required airtightness. Such a problem in microphone placement may occur not only in a foldable portable information device as in the above-mentioned Japanese Unexamined Patent Application Publication No. 2018-112833, but also in a flat tablet PC or a laptop PC with an extremely narrow bezel member, for example.

In view of the above problems of the conventional techniques, the present invention aims to provide a portable information device capable of attaching a microphone to a chassis with a high degree of airtightness, and a microphone pressure component mounted on the portable information device.

A portable information device according to a first aspect of the present invention includes: a chassis having an upper cover defining a top face, a lower cover defining a bottom face, and a vertical wall standing between an edge of the upper cover and an edge of the lower cover to define a side face; a microphone hole that penetrates the vertical wall and opens to the side face; a microphone module disposed in the chassis and including a microphone facing the microphone hole, the microphone module being configured to acquire sound information outside the chassis with the microphone; and a microphone pressure component that is disposed between the vertical wall and one of the upper cover and the lower cover to be compressed therebetween and press the microphone module against an inner face of the vertical wall.

A portable information device according to a second aspect of the present invention includes: a chassis with a microphone hole that penetrates an outer wall of the chassis; a microphone module including a microphone placed to face the microphone hole in the chassis, the microphone module being fixed to an inner face of the outer wall with an adhesive member; and a microphone pressure component configured to press the microphone module against an inner face of the outer wall.

A microphone pressure component according to a third aspect of the present invention is configured to press a microphone module against an inner face of a chassis of a portable information device to hold the microphone module. The microphone pressure component includes: an elastic part including a ring body; a locking part making up the ring body, the locking part being locked by a receiver disposed in the chassis; and a microphone holder standing up from the ring body and having a face on the other side of a face directed to the elastic part to hold the microphone module. The elastic part between the locking part and the microphone holder generates a biasing force in a direction of mutually separating the locking part and the microphone holder to press the microphone module against an inner face of the chassis via the microphone holder.

The above-described aspects of the present invention enable attachment of a microphone to a chassis with a high degree of airtightness.

DETAILED DESCRIPTION OF THE INVENTION

Referring to the attached drawings, the following describes a portable information device and a microphone pressure component according to the present invention in details, by way of preferable embodiments.

Figure 1:
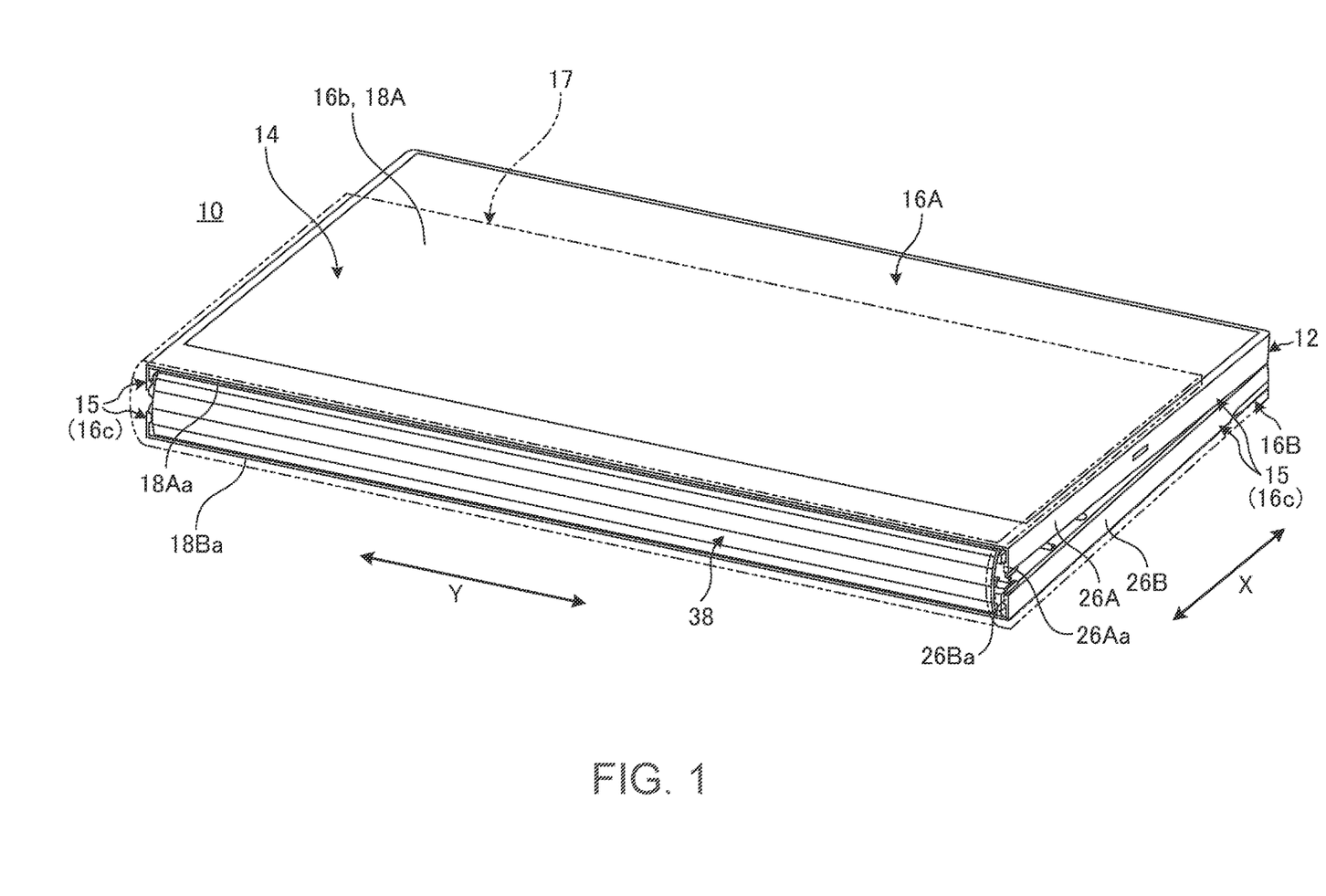
FIG. 1 is a perspective view of a portable information device according to one embodiment that is closed to a folded form.
Figure 2:
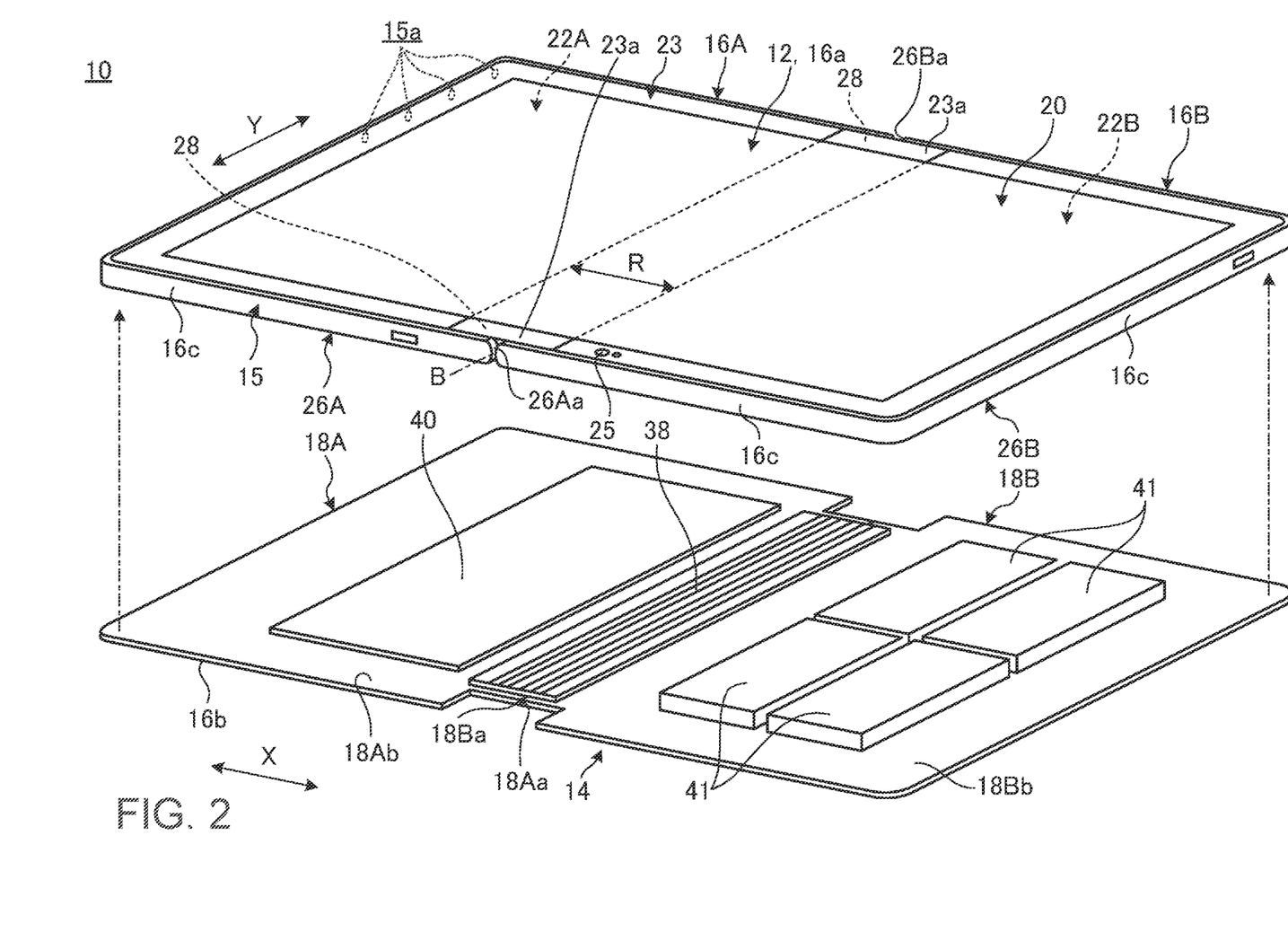
FIG. 2 is a schematic exploded perspective view of the portable information device in FIG. 1 that is opened to a flat plate form.

FIG. 1 is a perspective view of a portable information device 10 according to one embodiment that is closed to a folded form. FIG. 2 is a schematic exploded perspective view of the portable information device 10 in FIG. 1 that is opened to a flat plate form.

As illustrated in FIGS. 1 and 2, the portable information device 10 includes a first chassis 16A and a second chassis 16B that have a flattened box shape defined with an upper cover 12, a lower cover 14, and a vertical wall 15. The portable information device 10 is a laptop PC or a tablet PC that is foldable like a book, with the chassis 16A and 16B connected to each other in a relatively rotatable manner. The portable information device 10 may be other devices such as a mobile phone, a smartphone, and a portable game machine. FIG. 1 illustrates an outer cover 17 indicated with the alternate long and two short dash line, which is a flexible cover made of leather or cloth that covers the outer surfaces of the chassis 16A and 16B.

Hereinafter, as illustrated in FIGS. 1 and 2, the portable information device 10 will be described with reference to X direction where the chassis 16A and 16B are placed side by side, and Y direction orthogonal to X direction.

Figure 3:
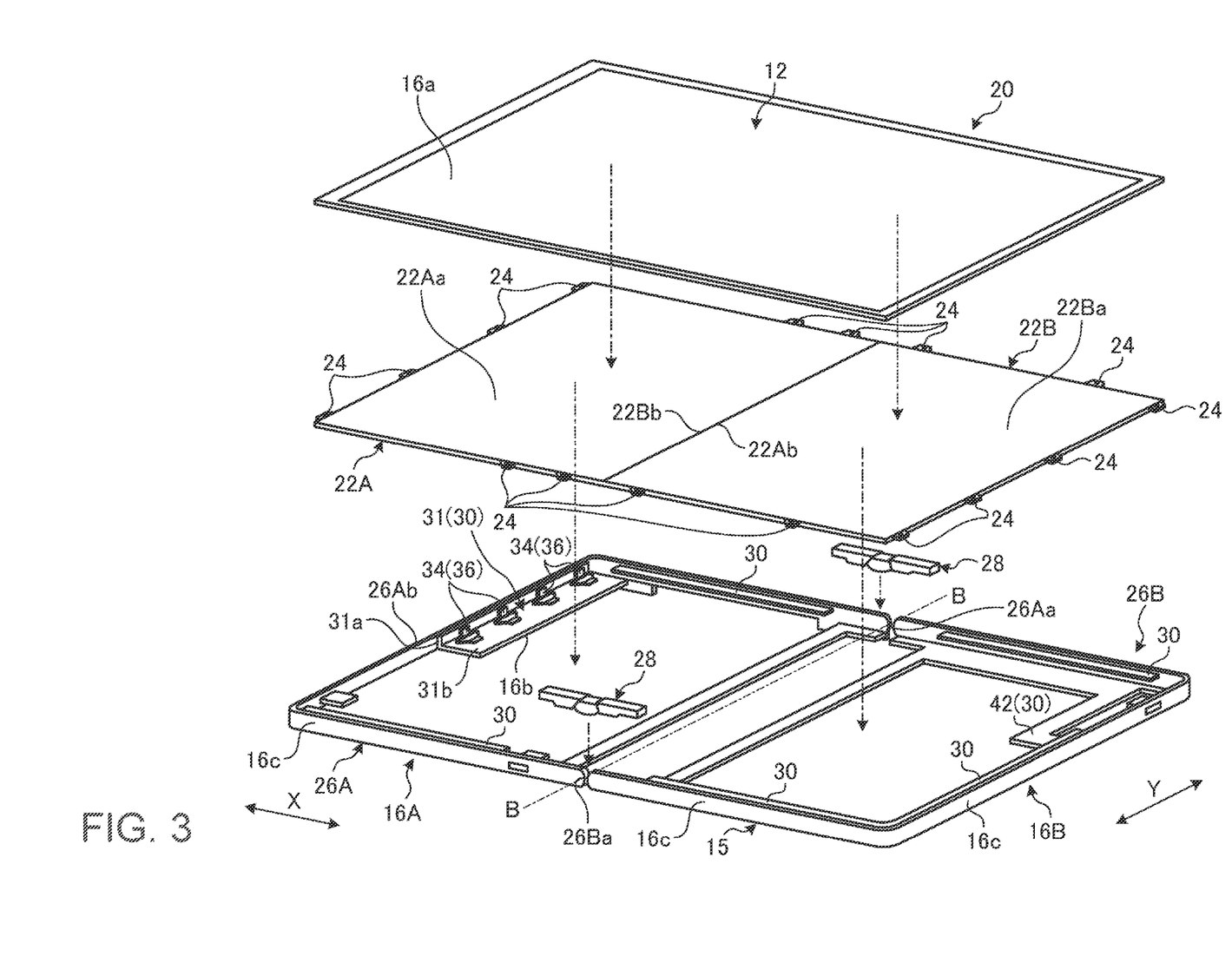
FIG. 3 is an exploded perspective view of the portable information device 10, illustrating a state of omitting bottom plates that make up the lower cover.

FIG. 3 is an exploded perspective view of the portable information device 10, illustrating a state of omitting bottom plates 18A and 18B that make up the lower cover 14. As illustrated in FIGS. 1 to 3, the chassis 16A and 16B are configured so that the upper cover 12 defines the top face 16a, the lower cover 14 defines the bottom face 16b, and the vertical wall 15 defines the outer peripheral side face 16c.

As illustrated in FIGS. 2 and 3, the upper cover 12 includes a display 20, a first plate 22A, a second plate 22B, and a bezel 23.

The display 20 is a flexible display such as an organic EL having a flexible paper structure, and is equipped with a touch panel. The display 20 extends across the chassis 16A and 16B, and has a belt-shaped bending region R extending in Y direction at a position straddling the boundary of the chassis 16A and 16B. The display 20 may not be a flexible display, and may be a dual display with a flat-plate display on the top face 16a of each of the chassis 16A and 16B. Alternatively, a flat-plate display may be provided on only one of the chassis 16A and 16B.

As illustrated in FIG. 3, the plates 22A and 22B have surfaces 22Aa and 22Ba that support the rear face of the display 20. The plates 22A and 22B are thin and hard plate members. The plates 22A and 22B of the present embodiment are fiber-reinforced resin plates made of carbon fiber, for example. The plates 22A and 22B may be metal plates such as stainless-steel plates. The first plate 22A supports the display 20 at a left half in FIG. 3. The second plate 22B supports the display 20 at a right half in FIG. 3.

The plates 22A and 22B have a plurality of tabs 24 for attachment that project from the peripheral end faces on the three sides excluding their adjacent end faces 22Ab and 22Bb. These tabs 24 are fastened to frames 26A and 26B defining the vertical wall 15 with screws. The rear faces of the plates 22A, 22B may be screwed directly to the frames 26A and 26B without using some or all of the tabs 24. In another structure of the display 20, the plates 22A and 22B may be omitted.

The bending region R of the display 20 is not fixed to the surfaces 22Aa and 22Ba of the plates 22A and 22B, and the portion other than the bending region R is attached to the surfaces 22Aa and 22Ba using double-sided tape, adhesive, or the like. That is, the bending region R is movable relative to the surfaces 22Aa and 22Ba. With this configuration, when the portable information device 10 is shifted to a folded form, the bending region R is curved into a substantially U-letter shape to be away from the plates 22A and 22B.

In the flat plate form where the plates 22A and 22B are placed side by side in their surface normal direction, their adjacent end faces 22Ab and 22Bb are in contact with each other. In this form, the display 20 is opened to one large screen like a flat plate, and the rear face of the screen is supported by the plates 22A and 22B arranged like a single plate. As illustrated in FIG. 1, the plates 22A and 22B in the folded form of folding the chassis 16A and 16B have the adjacent end faces 22Ab and 22Bb separated from each other, and have the surfaces 22Aa and 22Ba that are opposed to each other with the display 20 folded in a substantially U shape sandwiched therebetween.

As illustrated in FIG. 2, the bezel 23 is a frame member that surrounds the peripheral edge of the display 20. The bezel 23 extends along between the peripheral edge of the surface of the display 20 and the frames 26A and 26B, and is fixed to both with double-sided tape or adhesive. The bezel 23 covers a gap between the display 20, the plates 22A, 22B and the frames 26A, 26B. The bezel 23 is a sheet member made of resin, rubber, metal, or the like. The bezel 23 has a portion 23a overlapping the bending region R, and at least the portion 23a is flexible. The bezel 23 has an opening at a position in the second chassis 16B, and a camera 25 is placed in this opening (see FIG. 2).

As illustrated in FIGS. 1 to 3, the vertical wall 15 includes the first frame 26A and the second frame 26B.

The frames 26A and 26B are metal or resin frame members that are adjacent to each other and are placed side by side in X direction. The frames 26A and 26B are connected via hinges 28 between the adjacent ends 26Aa and 26Ba facing their boundary B, and are relatively rotatable about the boundary B.

As illustrated in FIG. 3, the first frame 26A has the three sides excluding the boundary B that define the side face 16c of the first chassis 16A. The second frame 26B has the three sides excluding the boundary B that define the side face 16c of the second chassis 16B. The frames 26A and 26B have a plurality of supporters 30 inwardly projecting from several parts of their inner peripheral walls. Some of the supporters 30 serve as bases to attach the tabs 24 of the plates 22A and 22B.

Hereinafter, of the first frame 26A having the four sides, the portion along the side distant form the second frame 26B and extending in Y direction is called a frame portion 26Ab. A support plate 31, which is one of the supporters 30, is placed on the inner face of this frame portion 26Ab.

The support plate 31 has a plate 31a defining a plane extending vertically and a plate 31b defining a plane extending in the XY direction, and has an L-shape in side view. The plate 31a is on the inner peripheral wall of the frame portion 26Ab, that is, on the rear of the side face 16c of the frame portion 26Ab. The plate 31b extends in X direction from the lower end of the plate 31a. The plate 31b is placed facing the inner face of the bottom plate 18A (see FIGS. 4 and 9), and makes up the lower cover 14 with the bottom plates 18A and 18B.

As illustrated in FIG. 3, microphone pressure components 36 support a plurality of (four in this embodiment) microphone modules 34 on the support plate 31. Each microphone module 34 acquires sound information outside the chassis 16A and 16B through microphone holes 15a (see FIGS. 2 and 7) penetrating through the vertical wall 15 (the plate 31a and the frame portion 26Ab). The detailed configuration of the microphone modules 34 and the microphone pressure components 36 will be described below.

As illustrated in FIG. 3, the hinges 28 are placed at the adjacent ends of the frames 26A and 26B, i.e., at both ends in Y direction. Each hinge 28 connects the frames 26A and 26B relatively rotatably, thereby connecting the chassis 16A and 16B relatively rotatably. In this embodiment, the rotary center between the frames 26A and 26B via the hinges 28 coincides with the surface of the display 20.

As illustrated in FIGS. 1 to 3, the lower cover 14 includes the first bottom plate 18A, the second bottom plate 18B, and some of the supporters 30 located on the lower face of the frames 26A and 26B.

The bottom plates 18A and 18B are adjacent to each other and are placed side by side in X direction. The bottom plates 18A and 18B are thin plates made of resin, metal, or the like. In the flat plate form illustrated in FIGS. 2 and 3, the bottom plates 18A and 18B are in contact at their adjacent end faces 18Aa and 18Ba, between which the boundary B is located. In the folded form illustrated in FIG. 1, the adjacent end faces 18Aa and 18Ba of the bottom plates 18A and 18B are separated from each other.

A backbone member 38 is placed on the inner faces 18Ab and 18Bb of the bottom plates 18A and 18B so as to extend over the adjacent end faces 18Aa and 18Ba. The backbone member 38 has a first end on the first bottom plate 18A that is slidable in X-direction relative to the first bottom plate 18A, and has a second end on the second bottom plate 18B that is not slidable relative to the second bottom plate 18B. In the flat plate form, the backbone member 38 is stored on the inner faces 18Ab and 18Bb (see FIG. 2). In the folded form, the backbone member 38 is curved to cover the gap between adjacent end faces 18Aa and 18Ba (see FIG. 1).

The first bottom plate 18A is to close the lower opening of the first frame 26A. The first bottom plate 18A is removably secured to the first frame 26A with screws or locking claws. On the inner face 18Ab of the first bottom plate 18A, a motherboard 40 on which a CPU and memory, not illustrated, are mounted and an antenna device, not illustrated, are fixed.

The second bottom plate 18B is to close the lower opening of the second frame 26B. The second bottom plate 18B is removably secured to the second frame 26B with screws or locking claws. On the inner face 18Bb of the second bottom plate 18B, battery units 41 and an antenna device, not illustrated, are fixed, for example.

Some of the supporters 30 are disposed in parallel and proximate to the inner faces 18Ab, 18Bb of the bottom plates 18A, 18B, and make up the lower cover 14 together with the bottom plates 18A and 18B. For instance, the supporters 30 making up the lower cover 14 in the first frame 26A include the plate 31b of the support plate 31. The supporters 30 making up the lower cover 14 in the second frame 26B include a plate 42 (see FIG. 3). These plates 31b and 42 are disposed having a slight gap with the bottom plates 18A and 18B (see, for example, the plate 31b illustrated in FIG. 9) and are substantially a part of the bottom plates 18A and 18B. These plates 31b and 42 may be disposed on the bottom plates 18A and 18B. In the present embodiment, the plates 31b and 42 are disposed at the frames 26A and 26B, because the bottom plates 18A and 18B need to be detachable from the frames 26A and 26B for maintenance, for example.

Figure 4:
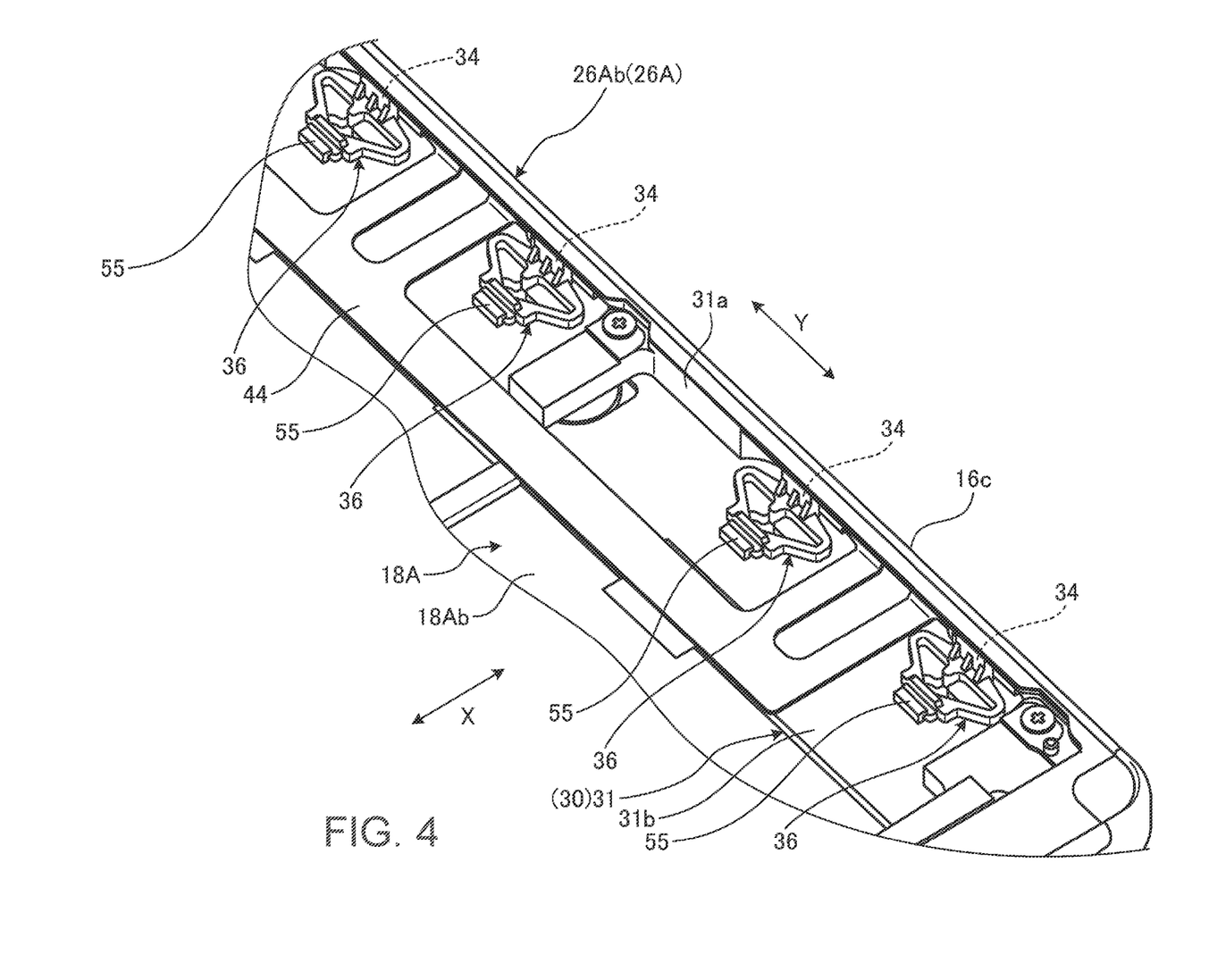
FIG. 4 is an enlarged perspective view of the microphone modules, the microphone pressure components, and their surroundings.
Figure 5:
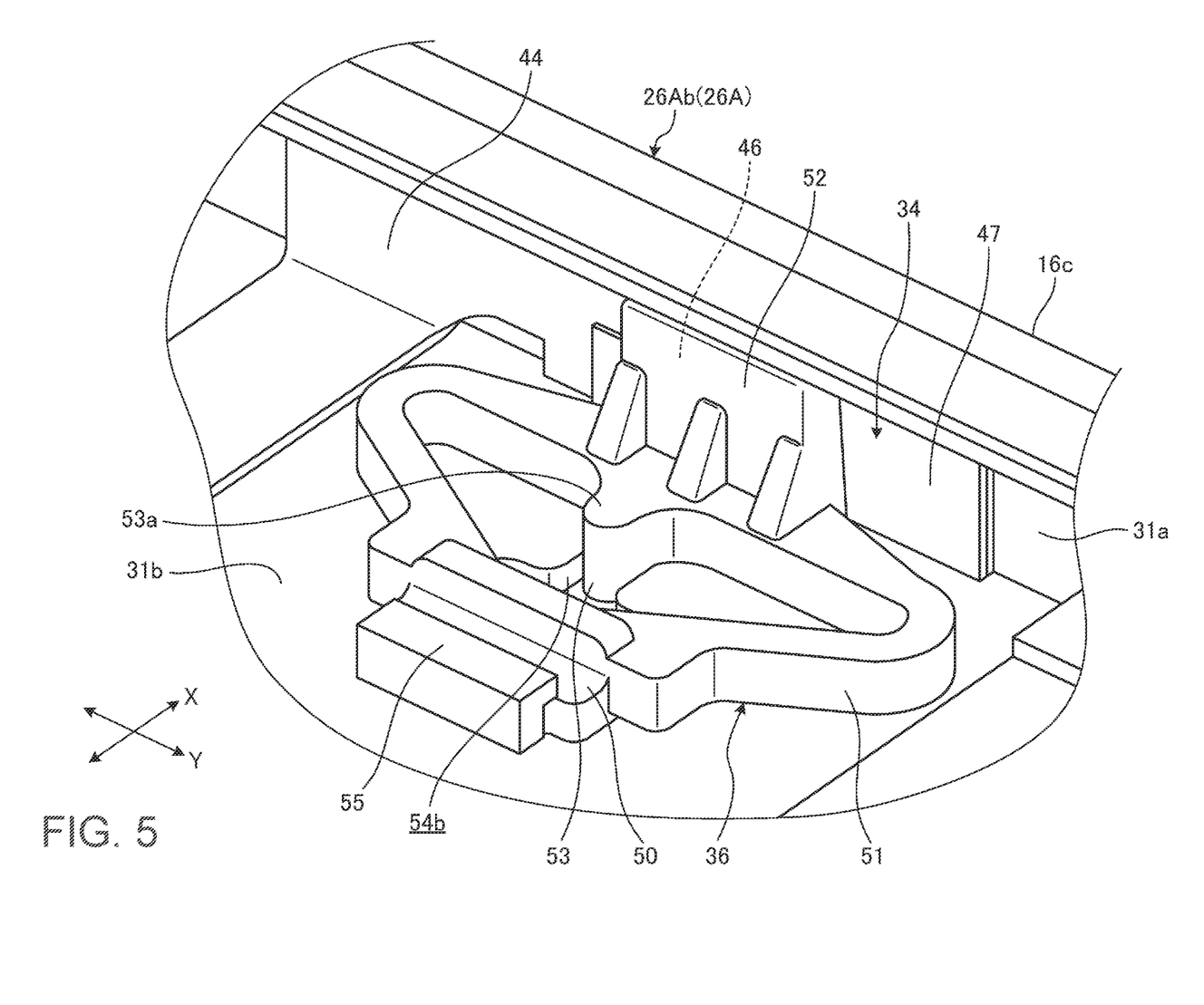
FIG. 5 is an enlarged perspective view of one of the microphone modules, the microphone pressure component, and their surroundings.
Figure 6A:
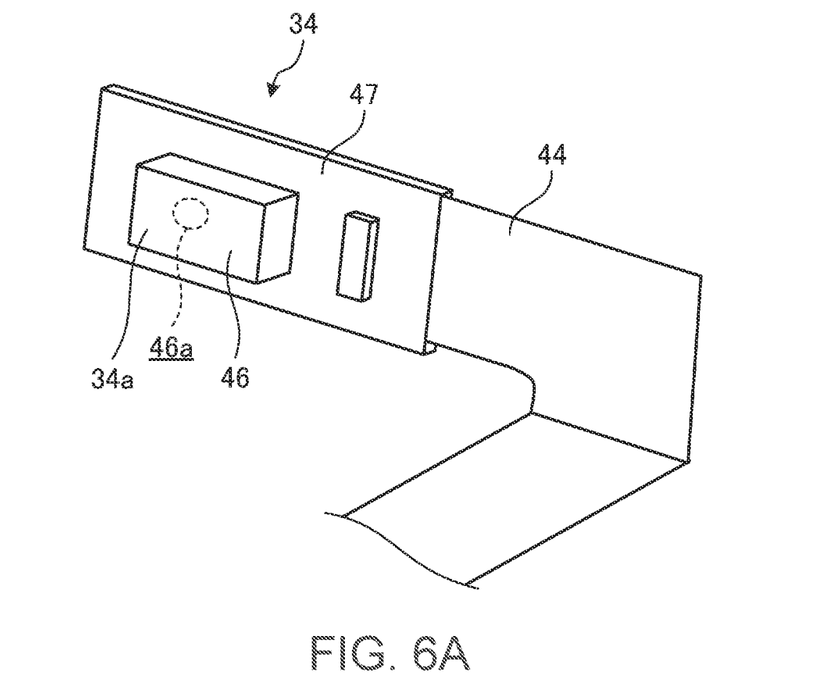
FIG. 6A is a perspective view schematically illustrating a microphone module and a flexible printed circuit that serves as its electrical wiring.
Figure 6B:
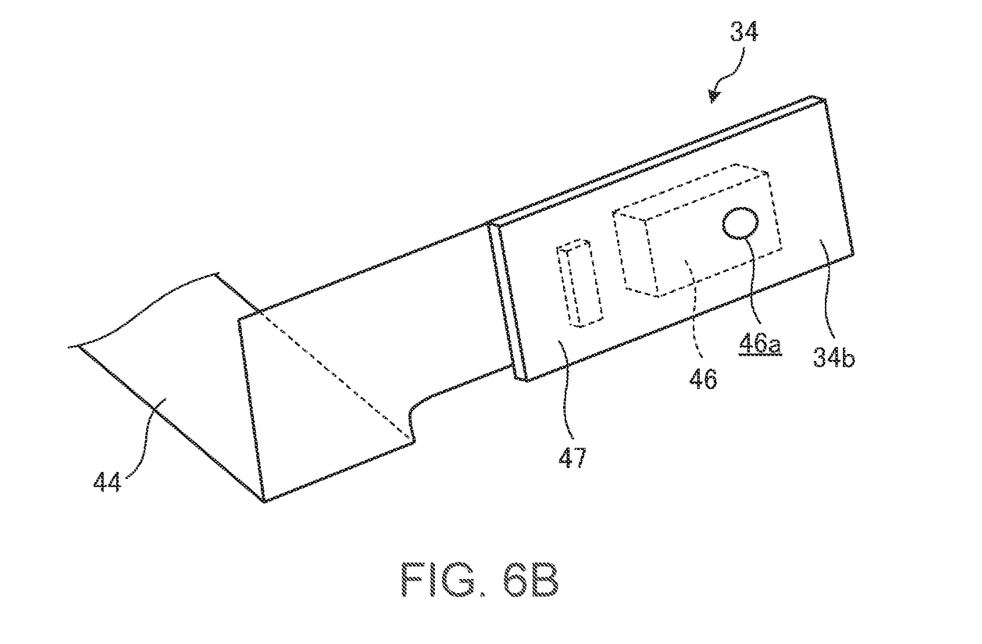
FIG. 6B is a perspective view schematically illustrating the microphone module and the flexible printed circuit viewed from a direction different from FIG. 6A.

Next the following describes the configuration and the attachment structure of the microphone modules 34. FIG. 4 is an enlarged perspective view of the microphone modules 34, the microphone pressure components 36, and their surroundings. FIG. 5 is an enlarged perspective view of one of the microphone modules 34, the corresponding microphone pressure component 36, and their surroundings. FIGS. 6A and 6B are perspective views schematically illustrating the structures of the microphone module 34 and a flexible printed circuit (FPC) 44 that serves as electrical wiring thereof.

As illustrated in FIGS. 6A and 6B, the microphone module 34 includes a microphone 46 and a board 47. In one example, the microphone 46 is a MEMS microphone with a MEMS chip having a vibrating membrane and an IC chip that are sealed. The board 47, on which the microphone 46 is mounted, is connected to a circuit board such as a mother board 40 or a sound board not illustrated via the FPC 44.

The microphone module 34 has the microphone 46 on a first face 34a directed to the front in FIG. 6A, and a sound hole 46a opening on a second face 34b directed to the front in FIG. 6B. The sound hole 46a is a sound input unit of the microphone module 34. The sound hole 46a is a minute hole penetrating through the board 47 from the face of the microphone 46 close to the second surface 34b, and is connected to the vibrating membrane inside the microphone 46.

As illustrated in FIG. 4, the portable information device 10 of the present embodiment includes the four microphone modules 34 that are aligned along the frame portion 26Ab and on the support plate 31 to face the side face 16c. These microphone modules 34 are connected to the common FPC 44, and then are connected to the motherboard 40 or the like via this FPC 44. The number of the microphone modules 34 installed may be changed as needed. One FPC 44 may be used for every one to three microphone modules 34. As illustrated in FIGS. 4 and 5, each microphone module 34 is brought in contact with the inner face of the plate 31a via the corresponding microphone pressure component 36.

Figure 7:
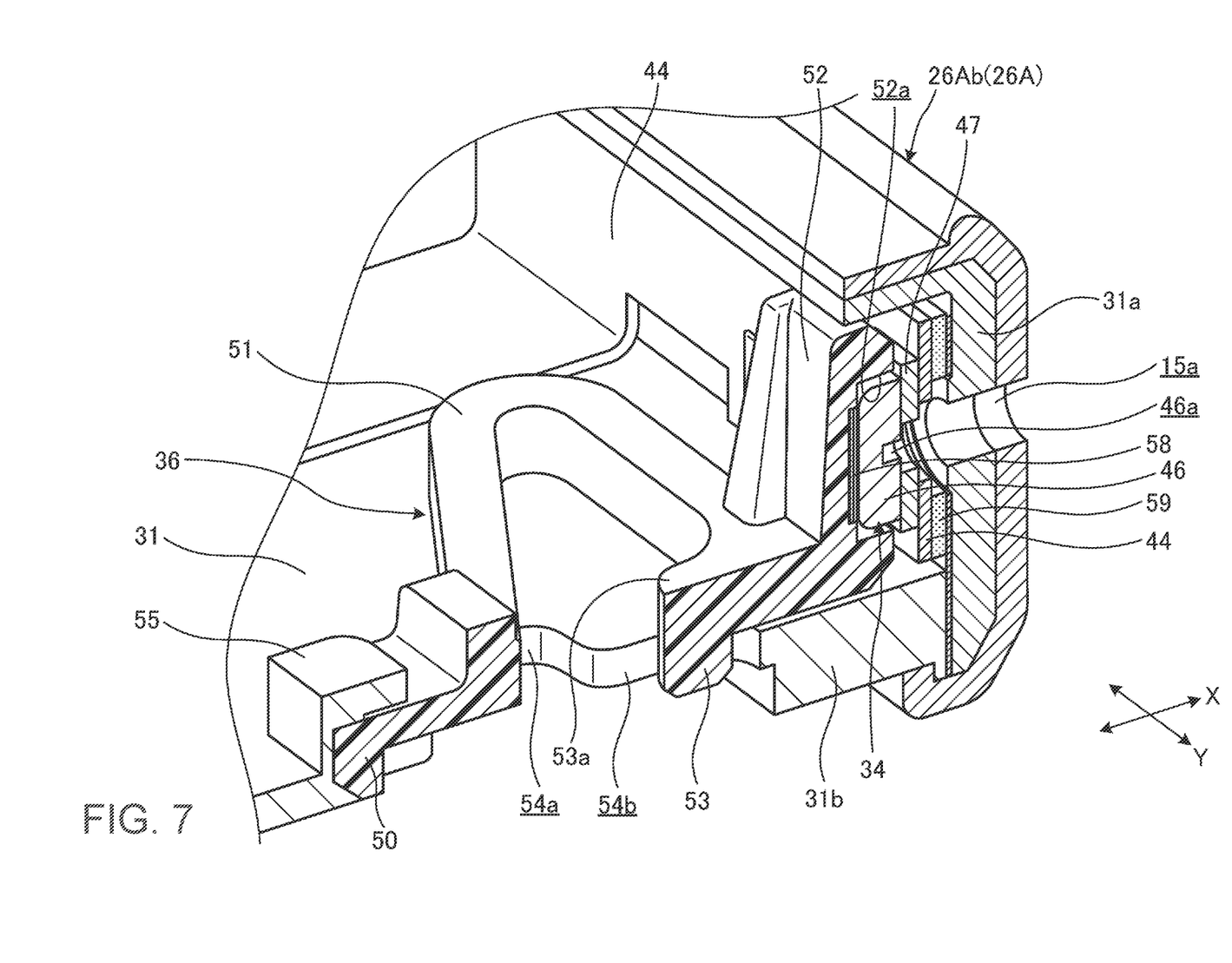
FIG. 7 is a cross-sectional perspective view of the microphone module and the microphone pressure component illustrated in FIG. 5.
Figure 8:
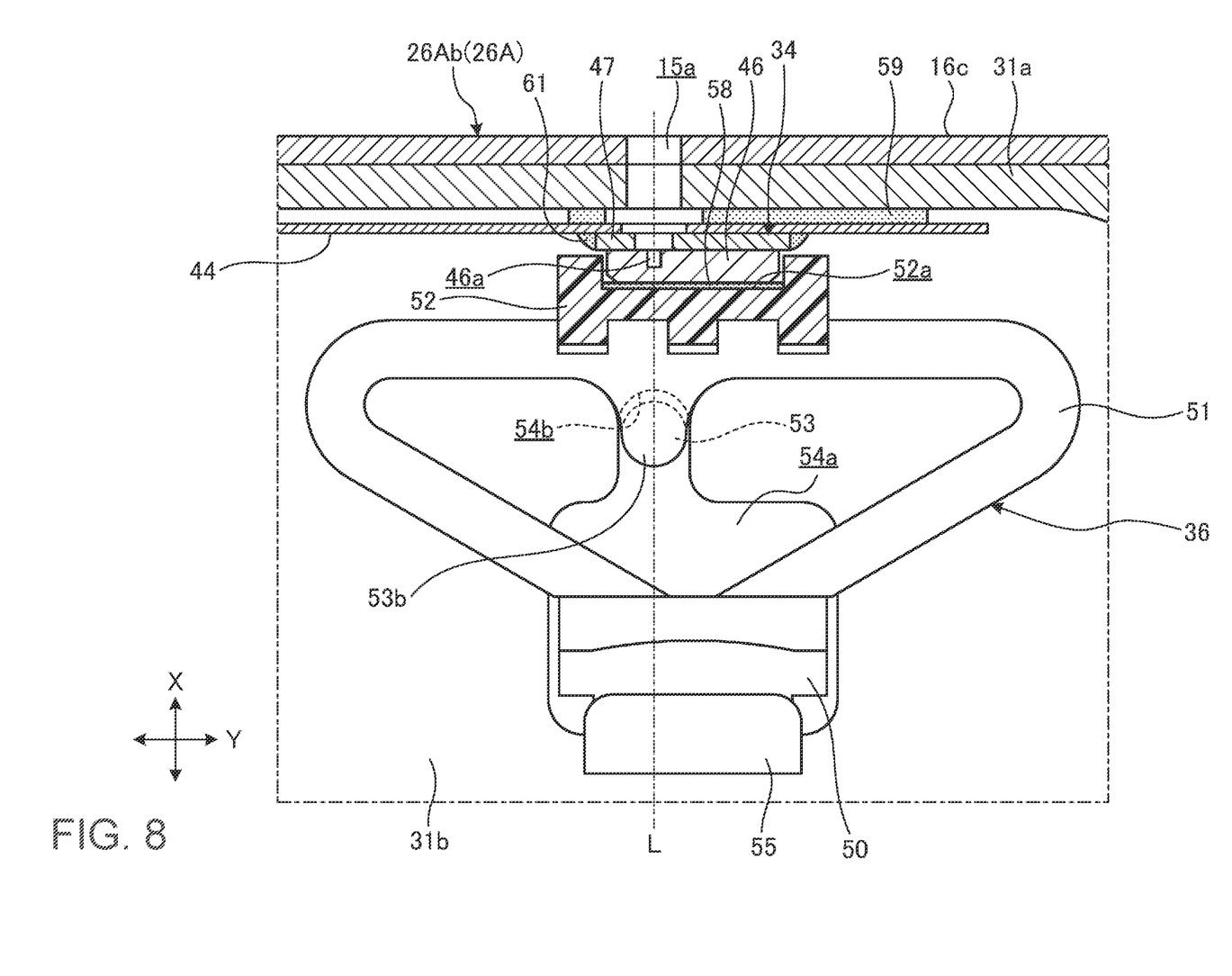
FIG. 8 is a planar cross-sectional view of the microphone module and the microphone pressure component illustrated in FIG. 5.
Figure 9:
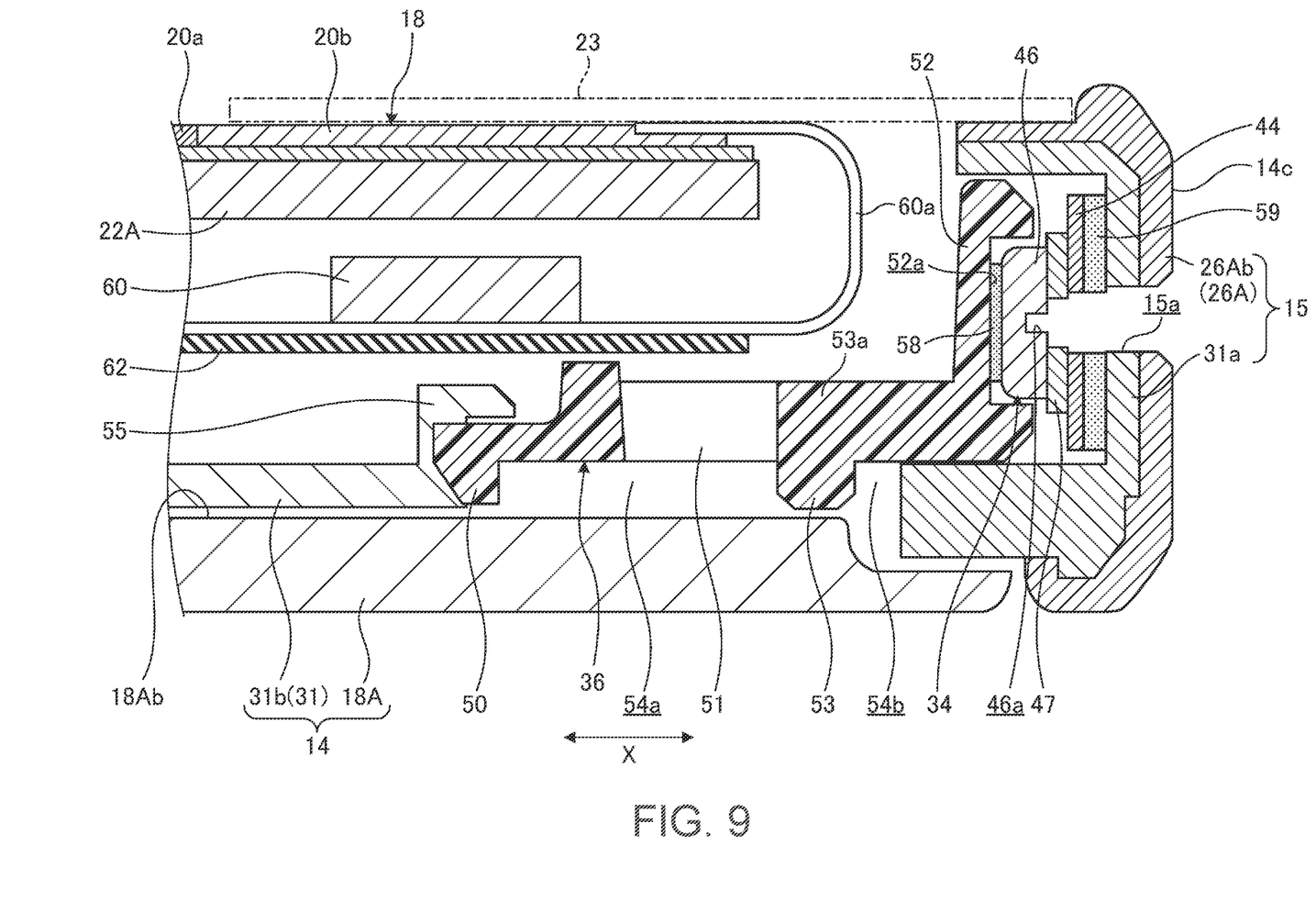
FIG. 9 is a side cross-sectional view of the microphone module 34 and the microphone pressure component illustrated in FIG. 5.

Then, the configuration of the microphone pressure component 36 will now be described. FIG. 7 is a cross-sectional perspective view of the microphone module 34 and the microphone pressure component 36 illustrated in FIG. 5. FIG. 8 is a planar cross-sectional view of the microphone module 34 and the microphone pressure component 36 illustrated in FIG. 5. FIG. 9 is a side cross-sectional view of the microphone module 34 and microphone pressure component 36 illustrated in FIG. 5.

As illustrated in FIGS. 5 and 7, each microphone pressure component 36 is placed between the vertical wall 15 and the lower cover 14 to be compressed therebetween, and presses the microphone module 34 against the inner face of the vertical wall 15. The microphone pressure component 36 includes a locking part 50, an elastic part 51, a microphone holder 52, and a positioning pin 53. The microphone pressure component 36 is a molded product of resin. The elastic part 51 of the microphone pressure component 36 includes a ring body (triangular ring) having a substantially triangular shape in plan view, and thus the microphone pressure component 36 as a whole has a substantially triangular frame shape.

As illustrated in FIGS. 5 and 7 to 9, the plate 31b (lower cover 14) on which the microphone pressure components 36 are disposed has a rectangular mounting hole 54a and a positioning hole 54b, which is a slot extending in X direction from the edge of the mounting hole 54a close to the plate 31a. The plate 31b has a hook-shaped receiver 55 on the peripheral edge of the mounting hole 54a on the other side of the position hole 54b. The receiver 55 stands upward and bends toward the mounting hole 54a.

The locking part 50 is located at the vertex (top) of the triangular ring of the elastic part 51. The locking part 50 has a substantially rectangular shape in plan view and a substantially crank shape in cross section. The locking part 50 is abutted against the receiver 55 through the mounting hole 54*a*. That is, the locking part 50 is locked by the receiver 55 and is positioned in the front-rear, left-right, and top-bottom directions.

The elastic part 51 is a hanger-shaped spring member including a ring body having a substantially triangular shape in plan view. The elastic part 51 is disposed between the locking part 50 and the microphone holder 52, and generates a biasing force in X direction that separates the locking part 50 and the microphone holder 52. At this time, the receiver 55 restricts the movement of the locking part 50 in X direction to be away from the microphone holder 52. This means that the elastic part 51 presses the microphone module 34 against the inner face of the vertical wall 15 via the microphone holder 52. In other words, the elastic part 51 includes a triangular ring body that is a molded product of resin, so that the ring body generates a repulsive force against a compressive force in X direction.

The elastic part 51 may include a quadrangular or oval ring body instead of the triangular body. The elastic part 51 may include a coil spring or a plate spring other than the ring body. The elastic part 51 of this embodiment includes a ring body, and is disposed with a lying posture along the inner face of the plate 31*b*. This keeps the elastic part 51 as thin as possible in the vertical direction, and generates a large biasing force (see FIG. 9). As a result, the elastic part 51 does not interfere with the display 20 above it.

The microphone holder 52 holds the microphone module and presses it against the vertical wall 15. The microphone holder 52 stands up from the base side of the triangle of the elastic part 51 and is parallel to the vertical wall 15 having a gap therebetween. The microphone holder 52 has a recessed portion 52*a* on the face on the other side of the face directed to the elastic part 51, that is, on the face directed to the vertical wall 15. The recessed portion 52*a* has a size for fitting with the microphone 46 of the microphone module 34 and thus enables positioning of the microphone 46. The microphone 46 of the microphone module 34 has the first face 34*a* that is fixed to the bottom face of the recessed portion 52*a* with an adhesive member 58 such as double-sided tape or adhesive agent.

The positioning pin 53 is a round pillar-shaped pin at a protruding portion 53*a* protruding inward from the base side of the triangle of the elastic part 51 and hanging downward from the protruding portion 53*a*. The positioning pin 53 is inserted into the positioning hole 54*b* of the plate 31*b*. The positioning pin 53 has the outer diameter that is substantially the same as the width of the positioning hole 54*b* in Y direction and is slightly smaller than that. In other words, when the positioning pin 53 is inserted into the positioning hole 54*b*, the microphone pressure component 36 is movable in X direction, i.e., in the pressing direction to press the microphone module 34 against the vertical wall 15. The movement of the positioning pin 53 is restricted in the positioning hole 54*b* in Y direction, that is, in the direction orthogonal to the pressing direction.

Next, the following describes an attachment structure of the microphone module 34 using the microphone pressure component 36.

First, the microphone module 34, to which the FPC 44 is connected, is fixed to the microphone holder 52 of the microphone pressure component 36. Specifically, the first face 34*a* of the microphone 46 is fixed to the bottom face of the recessed portion 52*a* with the adhesive member 58, so that the microphone module 34 is assembled with the microphone pressure component 36. The present embodiment includes four microphone modules 34, and each of these microphone modules 34 connected via a single FPC 44 is fixed to the corresponding microphone pressure component 36. At this time, the microphone module 34 is provided with an adhesive member 59 such as double-sided tape on the second face 34*b*. Reference numeral 61 in FIG. 8 denotes a sealing material such as adhesive provided so as to go around the edge of the fixed face between the board 47 and the FPC 44. The sealing material 61 enhances the airtightness at the boundary face between the board 47 and the FPC 44.

Next, the locking part 50 of each microphone pressure component 36 to which the corresponding microphone module 34 is fixed is engaged with the corresponding receiver 55. At the same time, the positioning pin 53 is inserted into the positioning hole 54*b*. This sets the microphone pressure components 36 in the plate 31*b*, so that their microphone holders 52 press the second faces 34*b* of the microphone modules 34 against the inner face of the vertical wall 15 (plate 31*a*). At this time, the microphone modules 34 are fixed to the inner face of the plate 31*a* via the adhesive members 59 on the second faces 34*b*.

In the plan view of FIG. 8, the present embodiment is configured so that the straight line L extending in X direction passing through the center of the positioning pin 53 passes through the centers of the sound hole 46*a* of the microphone 46 and the microphone hole 15*a*. With this configuration, the positioning of the microphone module 34 via the microphone pressure component 36 means that the sound hole 46*a* is axially aligned with and connected to the microphone hole 15*a*. The microphone module 34 therefore enables efficient acquisition of sound information outside of the chassis 16A and 16B through the microphone hole 15*a*.

As illustrated in FIG. 9, the microphone pressure component 36 is located at a position overlapping at least an inactive region 20*b* that is defined on the outer peripheral edge of an active region 20*a* of the display 20. The portable information device 10 is thin as illustrated in FIG. 9, and the bezel 23 is narrow. This means that the display 20 is close to the vertical wall 15, and the space under the lower face is also limited. Considering these, the microphone pressure components 36 each have a substantially L shape as a whole in side view, and especially its elastic part 51 is thin, so that the microphone pressure components 36 can be easily placed in a small space under the lower face of the edge of the display 20. Reference numeral 60 in FIG. 9 denotes a display control board connected to the display 20 via a FPC 60*a*. Reference numeral 62 in FIG. 9 denotes an insulating sheet that covers the lower face of the display assembly.

As described above, the portable information device 10 according to the present embodiment includes: the microphone modules 34 configured to acquire sound information outside of the chassis 16A and 16B through the microphone holes 15*a* penetrating through the vertical wall 15 and opening to the side face 16*c* and the microphones 46 placed to face the microphone holes 15*a*; and the microphone pressure components 36 that are placed between the lower cover 14 and the vertical wall 15 to be compressed therebetween so as to press the microphone modules 34 against the inner face of the vertical wall 15.

With this configuration of the portable information device 10, the microphone pressure components 36 press the microphone modules 34 against the inner face of the vertical wall 15 that defines the side face 16*c* of the chassis 16A. This allows the microphone modules 34 to be placed in close contact with the inner face of the vertical wall 15, which has an undercut and thus is difficult to undergo complicated machining such as for forming positioning pins. In this way, the microphones 46 are attached to the vertical wall 15 with a high degree of airtightness.

That is, this portable information device 10 mounts the microphones 46 in the chassis 16A with a high degree of airtightness, even when the space under the bezel 23 is small or the width of the bezel 23 is extremely narrow. In particular, the portable information device 10 of the present embodiment includes the foldable display 20 that covers the top faces 16a of the chassis 16A and 16B. This configuration makes it difficult to keep a space for placing a plurality of microphone modules 34 on the top faces 16a of the chassis 16A and 16B. The portable information device 10 enables attachment of the microphone modules 34 to the vertical wall 15 using the microphone pressure components 36.

In other words, the present embodiment uses the microphone pressure components 36 to stably attach the microphone modules 34 with two faces of the chassis 16A and 16B. If there is a problem such as space restrictions in the chassis 16A and 16B, the microphone modules 34 may be mounted so that the microphones 46 face the inner face of the upper cover 12 or the lower cover 14 instead of the vertical wall 15. In this case, the microphone pressure components 36 may be attached to the inner face of the vertical wall 15.

The portable information device 10 is configured so that the first face 34a of each microphone module 34 is fixed to the corresponding microphone pressure component 36 with the adhesive member 58 and the second face 34b having the sound hole 46a of the microphone 46 is fixed to the inner face of the vertical wall 15 with the adhesive member 59. This configuration allows the microphone 46 to be installed with a higher degree of airtightness, because each of the adhesive members 58, 59 receives a compressive force from the pressing force of the microphone pressure component 36.

The present invention is not limited to the above-described embodiments, and can be modified freely without deviating from the scope of the present invention.

The above description illustrates the configuration in which the microphone pressure components 36 are attached to the lower cover 14. Depending on the width and rigidity of the bezel 23, the microphone pressure components 36 may be placed between the upper cover 12 and the vertical wall 15 instead of to the lower cover 14. The above description illustrates the configuration in which the microphone pressure components 36 are mounted to the support plate 31 directed to the inner face of the bottom plate 18A as the lower cover 14. In another configuration, the microphone pressure components 36 may be attached to the bottom plate 18A.

The above describes the portable information device 10 that is foldable into half like a book as an example. Other than the configuration of folding the chassis of the same shape double, the present invention is applicable to various foldable portable information devices including: a double door configuration in which small chassis are foldably connected to the left and right edges of a large chassis; an S-shaped folding configuration in which chassis with different folding directions are connected to the left and right edges of a single chassis; and a J-shaped folding configuration in which a small chassis is foldably connected to one of the left and right edges of a large chassis. The number of connected chassis may be four or more.

The invention claimed is:

1. A portable information device comprising:
   a chassis having an upper cover defining a top face, a lower cover defining a bottom face, and a vertical wall standing between an edge of the upper cover and an edge of the lower cover to define a side face;
   a microphone hole in the vertical wall and that opens to the side face;
   at least one microphone module disposed in the chassis and includes a microphone facing the microphone hole, the at least one microphone module being configured to acquire sound information outside the chassis with the microphone; and
   a microphone pressure component that is disposed between the vertical wall and one of the upper cover and the lower cover, wherein the microphone pressure component is configured to be compressed between the vertical wall and the one of the upper and lower covers, and to press the at least one microphone module against an inner face of the vertical wall;
   wherein
   the microphone pressure component includes:
      a locking part that is locked by a receiver disposed on an inner face of the one of the upper and lower covers;
      a microphone holder that holds the at least one microphone module; and
      an elastic part disposed between the locking part and the microphone holder, the elastic part generating a biasing force to press the at least one microphone module against the inner face of the vertical wall via the microphone holder.

2. The portable information device according to claim 1, wherein
   the elastic part includes a ring body that is disposed along the inner face of the one of the upper and lower covers.

3. The portable information device according to claim 2, wherein
   the ring body has a substantially triangular shape,
   the locking part is located at a vertex of the ring body, and
   the microphone holder extends from a base side of the ring body along the vertical wall.

4. A portable information device comprising:
   a chassis having an upper cover defining a top face, a lower cover defining a bottom face, and a vertical wall standing between an edge of the upper cover and an edge of the lower cover to define a side face;
   a microphone hole in the vertical wall and that opens to the side face;
   at least one microphone module disposed in the chassis and includes a microphone facing the microphone hole, the at least one microphone module being configured to acquire sound information outside the chassis with the microphone;
   a microphone pressure component that is disposed between the vertical wall and one of the upper cover and the lower cover, wherein the microphone pressure component is configured to be compressed between the vertical wall and the one of the upper and lower covers, and to press the at least one microphone module against an inner face of the vertical wall;
   a positioning hole in an inner face of the one of the upper and lower covers and extending in a pressing direction in which the microphone pressure component presses the at least one microphone module against the inner face of the vertical wall; and a positioning pin configured to be inserted into the positioning hole and to be movable in the pressing direction and to be restricted in movement in a direction orthogonal to the pressing direction,
wherein
a center of a sound hole of the microphone and a center of the microphone hole is aligned with a center of the positioning hole.

5. The portable information device according to claim 1, wherein
the at least one microphone module has a first face that is fixed, via a first adhesive member, to the microphone pressure component, and has a second face on another side of the first face, the second face having a sound hole of the microphone and is fixed, via a second adhesive member, to the inner face of the vertical wall.

6. The portable information device according to claim 1, further comprising
a plurality of microphone modules that are aligned along the side face.

7. The portable information device according to claim 1, wherein
the chassis includes:
a first chassis; and
a second chassis adjacent to the first chassis and rotatably connected to the first chassis via a hinge,
wherein
the portable information device further comprises:
a display at least on a top face of the first chassis, and
the one of the upper and lower covers is the lower cover.

8. The portable information device according to claim 7, wherein
the microphone pressure component is disposed in the first chassis, and at least a part of the microphone pressure component overlaps the display.

9. The portable information device according to claim 7, wherein
the display extends from a top face of the first chassis to a top face of the second chassis, and has a bending region that is bendable at a position overlapping the hinge.

10. A portable information device comprising:
a chassis with a microphone hole in a first outer wall of the chassis;
a microphone module including a microphone that faces the microphone hole in the chassis, the microphone module being fixed, via an adhesive member, to an inner face of the first outer wall; and
a microphone pressure component configured to press the microphone module against the inner face of the first outer wall;
wherein
the microphone pressure component includes:
a locking part that is locked by a receiver disposed on an inner face of a second outer wall that is adjacent to the first outer wall having the microphone hole and that intersects the first outer wall;
a microphone holder that holds the microphone module; and
an elastic part disposed between the locking part and the microphone holder, the elastic part generating a biasing force to press the microphone module against the inner face of the first outer wall via the microphone holder.

11. A microphone pressure component configured to press a microphone module against an inner face of a chassis of a portable information device to hold the microphone module, comprising:
an elastic part including a ring body;
a locking part of the ring body, the locking part being locked by a receiver disposed in the chassis; and
a microphone holder extending from the ring body and having a face on another side of a face directed to the elastic part to hold the microphone module,
wherein
the elastic part between the locking part and the microphone holder generates a biasing force to press the microphone module against an inner face of the chassis via the microphone holder.

* * * * *